Aug. 20, 1946.  E. G. KING  2,406,227
CONTAINER CLOSURE
Filed June 30, 1944

Inventor
Ellis Gay King
by
Walter F. Kaufman
Attorney

Patented Aug. 20, 1946

2,406,227

UNITED STATES PATENT OFFICE 2,406,227

CONTAINER CLOSURE

Ellis Gray King, Pittsburgh, Pa., assignor to Armstrong Cork Company, Lancaster, Pa., a corporation of Pennsylvania Application June 30, 1944, Serial No. 542,895

14 Claims. (Cl. 215—40)

This invention relates to container closures including sealing elements and is primarily concerned with a container closure including a sealing element formed of a tough, flexible, cured alkyd resin consisting of the reaction product of a saturated aliphatic dibasic acid, dipropylene glycol and an unsaturated aliphatic dibasic acid. The particular acids and proportions thereof which may be used to achieve my new results are more fully hereinafter set forth.

Closures are used with a large variety of containers, such as bottles, jars, cans, pails, and the like. A sealing element or liner is required in substantially all types of container closures. These liners must be relatively tough, flexible, and resilient so that a tight seal is formed between the closure sealing element and the lip of the container and must be sufficiently devoid of cold flow so that the seal is maintained indefinitely. The liner should be impervious to gas even at elevated temperatures and pressures and must not impart an objectionable taste or odor to the food or beverage within the container. Further, the sealing element should be non-tacky so that portions thereof will not adhere to the container lip and be unsightly when the closure is removed and must be relatively insoluble and infusible so as to be substantially unaffected by a large variety of container contents.

Certain compositions have been proposed or used heretofore as materials suitable for use in container closures as sealing liners. For example, rubber and rubber compositions have been used, but rubber, and especially vulcanized rubber, tends to impart an objectionable odor and taste to the container contents. Alkyd resins which are the reaction product of a polyhydric alcohol and a polybasic acid have, in general, been found to have serious drawbacks which make them undesirable as sealing elements in closures. For example, alkyd resins of the saturated dibasic acid-polyhydric alcohol type cure by condensation, yielding water which tends to produce a porous structure which will not form a gas-tight seal. Further, these resins require extended periods at high temperatures to effect curing, and what is most important, these resins are too viscous to be poured readily into a closure for forming therein a sealing element. Reducing the reaction time so as to produce less viscous resins does not solve the problem for such less viscous resins require even a longer time for curing and produce even more water during condensation. Many of the other alkyd resins cannot be readily cured. While many of those alkyd resins modified with a drying oil do cure to a tack-free condition, the drying oil tends to impart taste and odor to the contents of the container, especially if there is a small amount of oil present that has become rancid.

It is an object of this invention to provide an improved closure comprising a shell and a novel and improved closure sealing element.

It is a further object of this invention to provide a closure comprising a shell and an improved sealing element formed of a particular alkyd resin.

I have discovered an improved container closure comprising a shell of any desired configuration and a sealing element of a certain cured alkyd resin which functions particularly satisfactory as a closure sealing element. The condensed alkyd resin has the important and highly desirable advantage in that it can be readily poured into a closure and relatively easily cured therein to form a sealing element. The fact that the resin can be poured into the closure shell and cured is highly desirable in that preforming and inserting problems are eliminated.

This and other advantages and objects will become more apparent when the following description is considered along with the accompanying drawing, in which.

Figure 2:
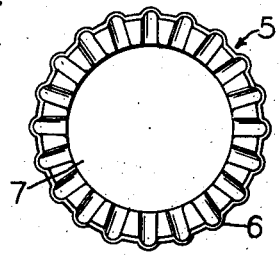
Figure 2 is a plan view of the closure of Figure 1.
Figure 1:
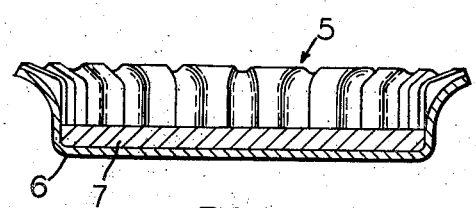
Figure 1 is a sectional view of a crown type closure embodying my invention.
Figure 3:
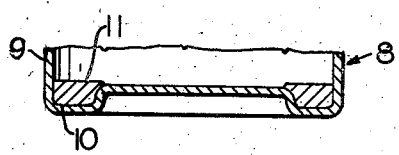
Figure 3 is a sectional view of another type of closure also embodying my invention.

Referring more particularly to Figures 1 and 2, a crown closure 5 comprises a shell 6 and a sealing element 7. The sealing element 7 is shown in the form of a disk but may be in the form of an annular ring as shown in Figure 3. When the closure 5 is placed on a container, such as a bottle, the sealing element 7 engages a lip on the bottle to form a gas-tight seal.

Figure 3 shows a different type of closure 8 comprising a shell 9 having an annular groove 10 formed therein. The groove 10 contains an annular sealing ring 11.

My new closures are not limited to any particular shape or design of either the closure shell or the sealing member though I am primarily concerned with the well-known crown-type closure, such as is shown in Figure 1.

The sealing elements 7 and 11 are formed from an alkyd resin which must be prepared by condensing and curing a mixture comprising a saturated aliphatic dibasic acid, dipropylene glycol, and an unsaturated aliphatic dibasic acid.

The saturated aliphatic dibasic acid which may be used is any one of a limited group of such acids containing 4 to 10 carbon atoms. For example, succinic acid, adipic acid, or sebacic acid may be used, though I prefer to use adipic acid. While polybasic acids other than those just defined can be used in manufacturing alkyd resins, such other acids are not satisfactory with dipropylene glycol for my purposes.

The unsaturated dibasic acid may be any unsaturated aliphatic dibasic acid containing 4 to 5 carbon atoms in which the carbonyl groups are attached to two different carbon atoms and in which the carbon to carbon double bond is conjugated with at least one of the carbonyl groups. For example, maleic acid or anhydride, fumaric acid, itaconic acid, citraconic acid, and the like, or mixtures thereof, may be used, though we prefer maleic acid, maleic anhydride, and fumaric acid. Malic acid which yields fumaric acid, maleic anhydride, and water upon being heated to the reaction temperature can be used for it is the products, fumaric acid and maleic anhydride, which react. Fumaric acid at the temperatures of the reaction forms maleic anhydride and is, therefore, a full equivalent of maleic acid. It is well recognized that anhydrides of such dibasic acids are the full equivalents of the acids.

To further illustrate the definition of the unsaturated aliphatic dibasic acid, maleic acid has the formula,

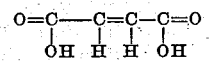

and contains two carbonyl groups,

These carbonyl groups are connected to two different carbon atoms. While in maleic acid the carbon to carbon double bond is conjugated with each of the carbonyl double bonds, it is only necessary for the carbon to carbon double bond to be conjugated with one of the carbonyl groups, as in itaconic where the formula is written as

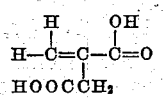

As long as the grouping

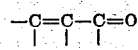

is present, the unsaturated aliphatic acid comes within the term "conjugated."

While any of the aforementioned acids may be used, I prefer to employ adipic acid as the saturated dibasic acid and either maleic acid, fumaric acid, or maleic anhydride as the unsaturated dibasic acid.

The ratio of saturated dibasic acid to unsaturated dibasic acid is critical. I have discovered that any of the saturated dibasic acids falling within the scope of my definition, may be used in an amount ranging from 36.5 grams to 219 grams for each gram molecular weight of unsaturated aliphatic acid. Thus, with each mol of unsaturated acid, there can be reacted from 0.25 mol to 1.5 mols of adipic acid, though when adipic acid is the saturated acid, I prefer to use from 0.25 mol to 1.0 mol of adipic acid for each mol of unsaturated dibasic acid.

If a relatively greater amount of the saturated dibasic acid is employed, the alkyd resin may not cure, or if it does, it is relatively soft and tends to crack under pressure and may be tacky. If a relatively smaller amount of saturated dibasic acid is used, the resin is too hard and does not compress sufficiently to form a satisfactory sealing element. I especially prefer to employ from 0.25 mol to 1.0 mol of adipic acid for each mol of maleic acid, fumaric acid, or maleic anhydride for it has been found that this resin is especially useful for crown type closures where the sealing element must retain relatively high carbonation pressures.

With the above-mentioned proportions of acids, it is only intended to include dipropylene glycol as the polyhydric alcohol. While I prefer to employ the dipropylene glycol in a molal amount equal to the total molal amount of both acids, there may be present excess amounts of either the acids in the above-mentioned ratios or there may be present an excess amount of the glycol so long as the excess acids or glycol are not present in an amount sufficient to prevent the formation by condensation of a soluble, fusible resin having an average molecular weight of at least 1,000. When there are present in the reaction mixture exactly equal molal amounts of glycol and acid, each condensation polymer theoretically has one terminal hydroxyl group and one terminal carboxyl group, whereas, if there is an excess amount of either acid or glycol, the polymers cannot condense without loss of the constituent in excess beyond that point where all terminal groups are the same; that is, where all terminal groups are either hydroxyl groups or carboxyl groups.

The cured, relatively infusible and insoluble alkyd resin is produced as the result of two different types of chemical reactions. The first reaction comprises an esterification or condensation reaction in which the acids and the alcohol combine with the elimination of water to form a fluid polyester resin of relatively low viscosity. In the second reaction, there is effected a cross-linking of the polyesters formed by condensation through the double bonds of the unsaturated acid present in such polymers to produce a relatively infusible and insoluble cured alkyd resin consisting of relatively large complex polymers. I prefer to cure the alkyd resin in an inert atmosphere, such as carbon dioxide, nitrogen, or the like, with the aid of a catalyst, such as benzoyl peroxide, though the resin may be cured to a tack-free condition in any other satisfactory manner.

The benzoyl peroxide is a solid and may be added to the resin in any known manner, though I prefer to dissolve it in styrene and then add this solution to the condensed resin to aid in curing the resin. The use of styrene is advantageous in that it increases the fluidity of the resin without causing bubbles in the resin during curing. I have used up to 30 parts of styrene to 100 parts of resin, though only about 10 parts by weight of the styrene polymerized, the remainder being evaporated during curing. This quantity of styrene tends to increase the toughness of the resin and, therefore, a slightly smaller amount of unsaturated acid may be used.

Alternatively, the benzoyl peroxide may be dissolved in benzene and added to the condensed resin and the benzene then evaporated, or the benzoyl peroxide may be added in solid form along with a curer, such as calcium sulphate. Other organic peroxide polymerization catalysts may be used.

I prefer to form the sealing element within the closure by pouring the relatively fluid resin resulting from the first condensation reaction into the closure seal and then curing the alkyd resin. If desirable, the alkyd resin ingredients may be esterified, cured by molding in the form of sheets and then annular rings or disks may be die cut therefrom and such a preformed sealing element inserted into the closure.

The following detailed examples, in which all parts are by weight, further illustrate my invention, though my invention is not limited to exact proportions or materials except as set forth in the accompanying claims.

*Example 1*

Closures having good sealing characteristics were prepared as follows:

|  | Grams |
|---|---|
| Maleic anhydride | 78.4 |
| Adipic acid | 58.5 |
| Dipropylene glycol | 164.8 |

These ingredients were mixed and then heated gradually with stirring to 200° C. while carbon dioxide was passed through the heated container. A trap was installed and 25 cc. of xylene was added and the temperature held at about 200° C. for 4¼ hours. Thereafter, vacuum was applied for 30 minutes at 110° C. to remove excess xylene. The curable condensation reaction product had an acid number of 35.9.

This curable resin was compounded as follows:

|  | Grams |
|---|---|
| Resin | 95 |
| Benzoyl peroxide | 0.5 |
| Styrene | 4.5 |
| Finely divided red slate | 66.7 |

These ingredients were thoroughly mixed and the resinous composition poured into crown shells. The resin was then cured under carbon dioxide gas for 35 minutes at 130° C. The closures were tested on containers containing 4.5 volumes of dissolved $CO_2$ gas and retained carbonation for one week at 125° F.

A second batch of this resinous composition was cured in a closed mold for 30 minutes at 130° C. to form a flexible, resilient product. Sealing elements were cut from this cured composition and were found to perform satisfactorily.

*Example 2*

Closures were prepared as follows:

|  | Grams |
|---|---|
| Maleic anhydride | 98 |
| Sebacic acid | 36.5 |
| Dipropylene glycol | 159 |

These ingredients were mixed and a curable resin prepared as described in Example 1, except that the mixture was heated at about 200° C. for 4 hours. The resin had an acid number of 34.3.

This resin was compounded as follows:

|  | Grams |
|---|---|
| Resin | 95 |
| Benzoyl peroxide | 0.5 |
| Styrene | 4.5 |
| Iron oxide | 66.7 |

Closures were prepared and tested as described under Example 1. The sealing elements performed satisfactorily, though this cured resin was somewhat harder than that described in Example 1.

*Example 3*

Closures were prepared as follows:

|  | Grams |
|---|---|
| Itaconic acid | 104 |
| Adipic acid | 117 |
| Dipropylene glycol | 214 |
| Hydroquinone (anti-oxidant) | 0.2 |

These ingredients were thoroughly mixed and then condensed as described in Example 1. The curable resin had an acid number of 35.2.

This resin was compounded as follows:

|  | Grams |
|---|---|
| Resin | 95 |
| Benzoyl peroxide | 0.5 |
| Styrene | 4.5 |
| Iron oxide | 47.5 |

Satisfactory closures were formed and tested as described in Example 1.

All of the closures described in the foregoing examples were found to be highly satisfactory for retaining relatively high carbonation pressures such as are encountered during the bottling and pasteurization of carbonated beverages.

The specific alkyd resins which I have found to be useful in forming sealing elements of closures may or may not be compounded with fillers. It is preferred to employ fillers, as they tend to reduce the cost. Any of the customary fillers may be employed; for example, iron oxide, slate, calcium carbonate, potter's flint, and the like or mixtures thereof.

Having described my invention in detail, it is obvious that some features may be employed without others, all without departing from the spirit or scope of my invention defined in the accompanying claims.

I claim:

1. A closure comprising a shell and a sealing element including a cured alkyd resin consisting of the cured condensation reaction product of from 36.5 to 219 grams of a saturated aliphatic dibasic acid containing 4 to 10 carbon atoms; one gram molecular weight of an unsaturated aliphatic dibasic acid containing from 4 to 5 carbon atoms and in which the two carbonyl groups are connected to two different carbon atoms and in which the carbon to carbon double bond is conjugated with at least one of the carbonyl double bonds; and dipropylene glycol in an amount sufficient to condense with said acids and form a resinous condensation product having an average molecular weight of at least 1,000.

2. A closure comprising a shell and a sealing element including a cured alkyd resin consisting of the cured condensation reaction product of from 0.25 to 1.5 mols of adipic acid; one gram molecular weight of an unsaturated aliphatic dibasic acid containing from 4 to 5 carbon atoms and in which the two carbonyl groups are connected to two different carbon atoms and in which the carbon to carbon double bond is conjugated with at least one of the carbonyl double bonds; and dipropylene glycol in an amount sufficient to condense with said acids and form a resinous condensation product having an average molecular weight of at least 1,000.

3. A closure comprising a shell and a sealing element including a cured alkyd resin consisting of the cured condensation reaction product of from 36.5 to 219 grams of a saturated aliphatic dibasic acid containing 4 to 10 carbon atoms; one gram molecular weight of an unsaturated aliphatic dibasic acid containing from 4 to 5 carbon atoms and in which the two carbonyl groups are connected to two different carbon atoms and in which the carbon to carbon double bond is conjugated with at least one of the carbonyl double bonds; and dipropylene glycol in a molal amount substantially equal to the total molal amount of both of said saturated and said unsaturated acids.

4. A closure comprising a shell and a sealing element including a cured alkyd resin consisting of the cured condensation reaction product of from 0.25 to 1.5 mols of adipic acid; one gram molecular weight of an unsaturated aliphatic dibasic acid containing from 4 to 5 carbon atoms and in which the two carbonyl groups are connected to two different carbon atoms and in which the carbon to carbon double bond is conjugated with at least one of the carbonyl double bonds; and dipropylene glycol in a molal amount substantially equal to the molal amount of both said adipic acid and said unsaturated acid.

5. A closure comprising a shell and a sealing element including a cured alkyd resin consisting of the cured condensation reaction product of from 0.25 to 1.0 mol of adipic acid; one mol of an unsaturated aliphatic dibasic acid containing from 4 to 5 carbon atoms and in which the two carbonyl groups are connected to two different carbon atoms and in which the carbon to carbon double bond is conjugated with at least one of the carbonyl double bonds; and dipropylene glycol in an amount sufficient to condense with said acids and form a resinous condensation product having an average molecular weight of at least 1,000.

6. A closure comprising a shell and a sealing element including a cured alkyd resin consisting of the cured condensation reaction product of from 0.25 to 1 mol of adipic acid; one mol of a compound selected from the group consisting of maleic acid, fumaric acid, and maleic anhydride; and dipropylene glycol in an amount sufficient to condense with said acids and form a resinous condensation product having an average molecular weight of at least 1,000.

7. A closure comprising a shell and a sealing element including a cured alkyd resin consisting of the cured condensation reaction product of from 0.25 to 1.0 mol of adipic acid; one mol of an unsaturated aliphatic dibasic acid containing from 4 to 5 carbon atoms and in which the two carbonyl groups are connected to two different carbon atoms and in which the carbon to carbon double bond is conjugated with at least one of the carbonyl double bonds; and dipropylene glycol in a molal amount substantially equal to the total molal amount of both said adipic acid and said unsaturated acid.

8. A closure comprising a shell and a sealing element including a cured alkyd resin consisting of the cured condensation reaction product of from 0.25 to 1.0 mol of adipic acid; one mol of an unsaturated acid selected from the group consisting of maleic acid, fumaric acid, and maleic anhydride; and dipropylene glycol in a molal amount substantially equal to the total molal amount of both said adipic acid and said unsaturated acid.

9. A closure comprising a shell and a sealing element including a cured alkyd resin consisting of the cured condensation reaction product of from 36.5 to 219 grams of a saturated aliphatic dibasic acid containing 4 to 10 carbon atoms; one gram molecular weight of maleic acid; and dipropylene glycol in an amount sufficient to condense with said acids and form a resinous condensation product having an average molecular weight of at least 1,000.

10. A closure comprising a shell and a sealing element including a cured alkyd resin consisting of the cured condensation reaction product of from 36.5 to 219 grams of a saturated aliphatic dibasic acid containing 4 to 10 carbon atoms; one gram molecular weight of maleic acid; and dipropylene glycol in a molal amount substantially equal to the total molal amount of both said saturated acid and said maleic acid.

11. A closure comprising a shell and a sealing element including a cured alkyd resin consisting of the cured condensation reaction product of from 0.25 to 1.0 mol of adipic acid; one mol of maleic acid; and dipropylene glycol in an amount sufficient to condense with said acids and form a resinous condensation product having an average molecular weight of at least 1,000.

12. A closure comprising a shell and a sealing element including a cured alkyd resin consisting of the cured condensation reaction product of from 0.25 to 1.0 mol of adipic acid; one mol of maleic acid; and dipropylene glycol in a molal amount substantially equal to the total molal amount of both said adipic acid and said maleic acid.

13. A closure comprising a shell and a sealing element including filler and a binder comprising a cured alkyd resin consisting of the cured condensation reaction product of 0.5 mol of adipic acid; one mol of maleic anhydride; and 1.5 mols of dipropylene glycol.

14. A closure comprising a shell and a sealing element including a binder consisting of at least 90% by weight of a cured alkyd resin and not more than 10% by weight of polystyrene, said cured alkyd resin consisting of the cured condensation reaction product of from 36.5 to 219 grams of a saturated aliphatic dibasic acid containing 4 to 10 carbon atoms; one gram molecular weight of an unsaturated aliphatic dibasic acid containing from 4 to 5 carbon atoms and in which the two carbonyl groups are connected with two different carbon atoms and in which the carbon to carbon double bond is conjugated with at least one of the carbonyl double bonds; and dipropylene glycol in a molal amount substantially equal to the total molal amount of both said saturated dibasic acid and said unsaturated dibasic acid.

ELLIS GRAY KING.